United States Patent [19]
Okano

[11] Patent Number: 6,055,371
[45] Date of Patent: Apr. 25, 2000

[54] COMPILE DEVICE, COMPILE METHOD AND RECORDING MEDIUM FOR RECORDING COMPILER

[75] Inventor: Shinichi Okano, Tokyo, Japan

[73] Assignee: NEC Corporation, Tokyo, Japan

[21] Appl. No.: 08/999,231

[22] Filed: Dec. 29, 1997

[30] Foreign Application Priority Data

Dec. 26, 1996 [JP] Japan ................................. 8-356889

[51] Int. Cl.⁷ ...................................................... G06F 9/45
[52] U.S. Cl. ............................................................. 395/709
[58] Field of Search ............................................. 395/709

[56] References Cited

U.S. PATENT DOCUMENTS

| | | | |
|---|---|---|---|
| 4,430,706 | 2/1984 | Sand ........................................ | 395/584 |
| 5,230,050 | 7/1993 | Iitsuka et al. ........................... | 395/707 |
| 5,511,198 | 4/1996 | Hotta ...................................... | 395/709 |
| 5,659,752 | 8/1997 | Heisch et al. .......................... | 395/704 |

OTHER PUBLICATIONS

Okano, Compile Device, Compile Method and Recording Medium for Recording Compiler. Japan Patent Application, Dec. 26, 1996.

Calder et al. Evidence–based Static Branch Prediction Using Machine Learning. ACM Transactions On Programming Languages and Systems. vol. 19. pp. 188–222, Jan. 1997.

*Primary Examiner*—Tariq R. Hafiz
*Assistant Examiner*—Wei Zhen
*Attorney, Agent, or Firm*—Young & Thompson

[57] ABSTRACT

When an object program including loops with conditional branch instructions is generated, information necessary for generation of an object program including an optimum code for high-efficiency execution of the loops must be obtained. A compile device is provided with branch history information code generating means which generates codes for obtaining information indicative of the number of repetitions at each execution of each loop included in the object program and a branch history of the conditional branch instructions in the loop, and generates the object program included the codes generated.

3 Claims, 3 Drawing Sheets

```
DO 10 I=1, N
    IF (A (I) . LT . X) THEN
      A (I) =B (I) +C (I)
    ENDIF
10 CONTINUE
```

Source program

```
(Code for obtaining number of loops included in program is
allocated to head of program)
. . . .

(Code for obtaining number of execution of each loop
included in program when the program has been executed is
allocated immediately before the loop)

DO 10 I=1, N (Code for obtaining number of repetitions in each loop
included in program when the program has been executed is
allocated immediately after the loop)

IF  (A (I)  . LT . X)  THEN (Code for obtaining information when program has been
executed is allocated immediately after branched loop. the
information indicative of whether or not branch conditions
of conditional branch instructions in each loop included in
program were satisfied)

A (I) =B (I) +C (I)
  ENDIF
10 CONTINUE
```

FIG. 3

COMPILE DEVICE, COMPILE METHOD AND RECORDING MEDIUM FOR RECORDING COMPILER

BACKGROUND OF THE INVENTION

1. Field of the Invention

This invention relates to a compile device, a compile method and a recording medium on which a compiler is recorded, which, when an object program including loops with conditional branch instructions is generated, obtains information necessary for generation of an object program including an optimum code for high-efficiency execution of the loops.

2. Description of the Related Art

Japanese Patent Laid-Open Application No. 63-53646 discloses a technique in which dynamic information counting means is provided for counting the number of times of the execution of respective sentences included in an object program to be executed, and calculating and preserving dynamic information composed of the average number of rotations (the average number of repetitions) of respective loops included in the object program and the average forming rate (true rate) of respective conditional expressions included in the respective loops. The dynamic information obtained by the dynamic information counting means at the time of compiling a source program is referred to so that an object program including an optimum code for high-efficiency execution of respective loops included in the source program can be generated.

With such a conventional technique, however, the dynamic information gathered by the dynamic information counting means, i.e., the average number of repetitions and the true rate in the object program, is not enough to generate an object program including an optimum code for high-efficiency execution of respective loops included in the source program.

Assuming that the object program is executed twice, both a case where respective loops are repeated 50 times for the first and second execution cycles of the object program, and a case where the respective loops are repeated 100 times for the first execution cycle alone result in an average number of 50 repetitions. Similarly, with the true rate, both a case where the first 50 times show "true" and the second 50 times show "false", and a case where "true" and "false" appear alternately result in an average true rate of 50%.

In the conventional technique, the average number of repetitions can not correctly impart the execution pattern of the loop to the compile device when the object program is executed plural times. Similarly, the true rate can not correctly impart to the compiler the true pattern of the conditional expression included in the loop. Thus, a problem arises that the compiler can not generate an object program including an optimum code for high-efficiency execution of the respective loops.

SUMMARY AND OBJECTS OF THE INVENTION

It is an object of the present invention to provide a compile device, when an object program including loops with conditional branch instructions is generated, which can generate an optimum code for high-efficiency execution of the loops.

A first compile device of the present invention comprising branch history information code generating means which generates a first instruction for obtaining the number of loops, at least one loop, being included in an object program and each repeating a predetermined instruction stream plural times, a second instruction for obtaining the number of times of the execution of each loop at execution of the loop, a third instruction for obtaining the number of repetitions of the instruction stream in each loop at execution of the loop and a fourth instruction for obtaining information indicative of whether or not branch conditions of conditional branch instructions included in each loop were satisfied at execution of the loop; and compile means which enters a source program, activates the branch history information code generating means and generates an object program including the instruction group generated by the branch history information code generating means.

A second compile device of the present invention is based on the first compile device of the present invention, in which the compile means generates an object program which allocates the first instruction to the head of the program, the second instruction immediately before the first instruction of the instruction stream in each loop, the third instruction immediately after the first instruction of the instruction stream in each loop and the fourth instruction immediately after an instruction stream at a destination branched by the conditional branch instructions in each loop.

A first compile method of the present invention comprising a step of branch history information code generation, the step including generation of a first instruction for obtaining the number of loops, at least one loop, being included in an object program and each repeating a predetermined instruction stream plural times, a second instruction for obtaining the number of times of the execution of each loop at execution of the loop, a third instruction for obtaining the number of repetitions of the instruction stream in each loop at execution of the loop and a fourth instruction for obtaining information indicative of whether or not branch conditions of conditional branch instructions included in each loop were satisfied at execution of the loop; and a compile step at which a source program is entered, the branch history information code generating step is executed and an object program including the instruction group generated at the branch history information code generating step is generated.

A second compile method of the present invention is based on the first compile method of the present invention, in which at the compile step the object program is so generated that the first instruction is allocated to the head of the program, the second instruction immediately before the first instruction of the instruction stream in each loop, the third instruction immediately after the first instruction of the instruction stream in each loop and the fourth instruction immediately after an instruction stream at a destination branched by the conditional branch instructions in each loop.

A first recording medium of the present invention which records thereon a program to make a computer execute its program processing, the program comprising branch history information code generation processing which generates a first instruction for obtaining the number of loops, at least one loop, being included in an object program and each repeating a predetermined instruction stream plural times, a second instruction for obtaining the number of times of the execution of each loop at execution of the loop, a third instruction for obtaining the number of repetitions of the instruction stream in each loop at execution of the loop and a fourth instruction for obtaining information indicative of whether or not branch conditions of conditional branch instructions included in each loop were satisfied at execution of the loop; and compile processing which enters a source program, executes the branch history information code generation processing and generates an object program including the instruction group generated in the branch history information code generation processing.

A second recording medium of the present invention is based on the first recording medium of the present invention, in which in said compile processing the object program is so generated that the first instruction is allocated to the head of the program, the second instruction immediately before the first instruction of the instruction stream in each loop, the third instruction immediately after the first instruction of the instruction stream in each loop and the fourth instruction immediately after an instruction stream at a destination branched by the conditional branch instructions in each loop.

A third recording medium of the present invention which records thereon an object program to make a computer execute its program processing, the object program comprising first processing for obtaining the number of loops, at least one loop, each repeating plural times a predetermined instruction stream including at least one conditional branch instruction, second processing for obtaining the number of times of the execution of each loop at execution of the loop, third processing for obtaining the number of repetitions of the instruction stream in each loop at execution of the loop and fourth processing for obtaining information indicative of whether or not branch conditions of the conditional branch instructions included in each loop were satisfied at execution of the loop.

A fourth recording medium of the present invention which records thereon an object program to make a computer execute its program processing, the object program comprising first processing which obtains the number of loops, at least one loop, each repeating plural times a predetermined instruction stream included in the object program at the time of starting execution thereof, generates a loop reference table capable of accepting a corresponding number of entries and stores the loop reference table in a branch history information file; second processing which creates a loop execution table in the first execution cycle of each loop, stores the loop execution table in the branch history information file and adds a new entry into the loop execution table according to the number of times of the execution of the loop each time the loop is executed; third processing which creates a repetition table in the first repetition cycle of the instruction stream in each loop, stores the repetition table in the branch history information file and adds a new entry into the repetition table according to the number of repetitions each time the instruction stream in the loop is repeated; and fourth processing which obtains information for each loop, the information indicative of whether or not branch conditions of the conditional branch instructions included in the loop were satisfied, creates a branch history table storing the information therein and stores the branch history table in the branch history information file.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

FIG. 3 is a diagram showing an example of a source program 1 in the embodiment of the present invention.

Here, it should be noted that like reference numerals represent like elements throughout the disclosure.

DETAILED DESCRIPTION OF THE PREFERRED EMBODIMENTS

Referring to the accompanying drawings, embodiments of the present invention will next be described.

Figure 1:
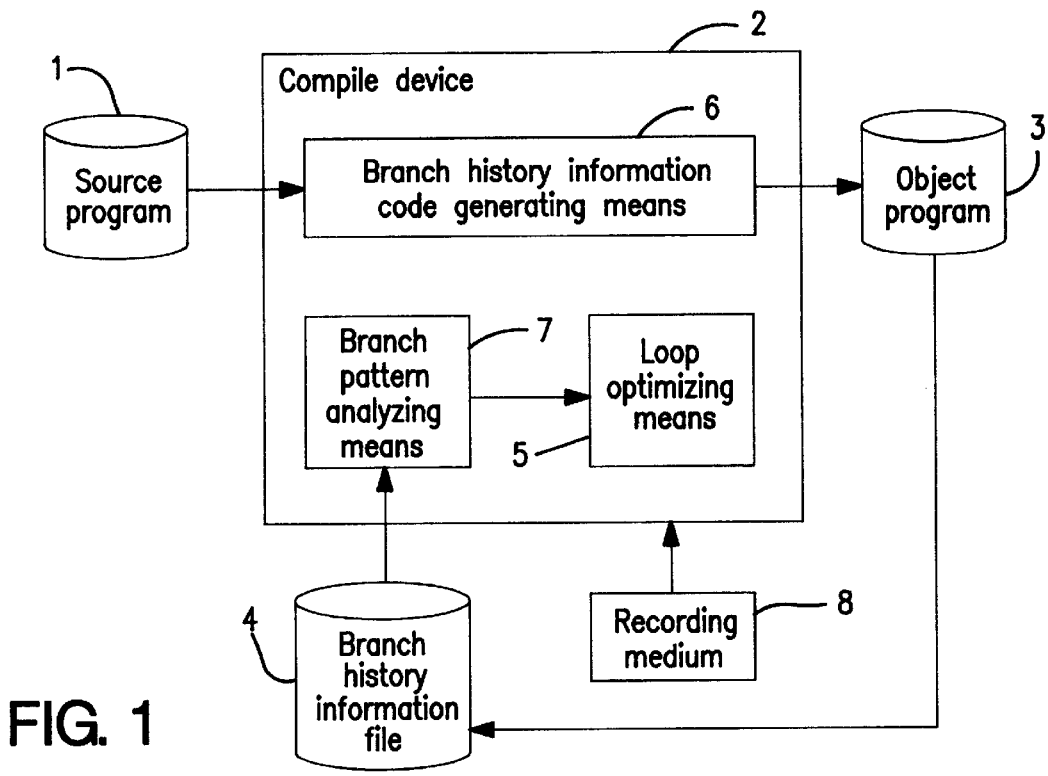
FIG. 1 is a block diagram showing an embodiment of the present invention.

As shown in FIG. 1, a first embodiment of the present invention includes a source program 1 to be compiled; a compile device 2 for compiling the source program 1 inputted thereto; an object program 3 to be generated by the compile device 2; and a branch history information file 4 for recording information obtained by executing the object program 3, the information composed of the number of repetitions of each loop that repeats a predetermined instruction stream plural times, and a branch history of conditional branch instructions included in the loop.

The compile device 2 includes branch history information code generating means 6 which generates codes for obtaining information during execution of each loop, the information composed of the number of repetitions at each execution of each loop included in the object program 3 and a branch history of conditional branch instructions in the loop; branch pattern analyzing means 7 for analyzing a branch pattern in the loop based on the information recorded in the branch history information file 4; and loop optimizing means 5 which generates an optimum code for high-efficiency execution of the loop.

Figure 2:
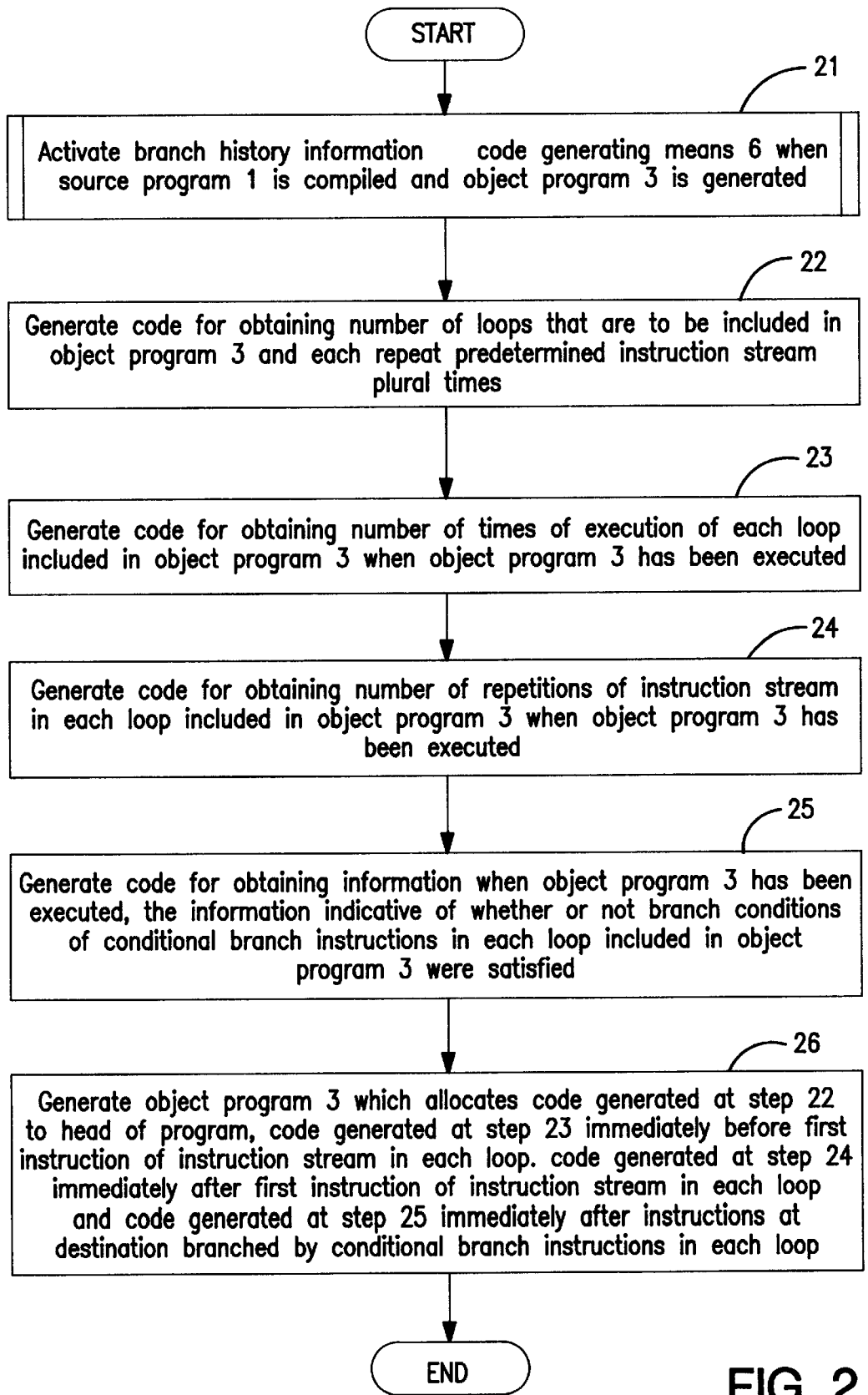
FIG. 2 is a flowchart showing operation of the embodiment of the present invention.

Referring next to FIGS. 1 and 2, operation of the first embodiment will be described in detail.

When the source program 1 is compiled and the object program 3 is generated, the compile device 2 activates the branch history information code generating means 6 (step 21).

At first, the branch history information code generating means 6 generates a code for obtaining the number of loops that are to be included in the object program 3 and each repeat a predetermined instruction stream plural times (step 22).

The branch history information code generating means 6 generates a code for obtaining the number of times of the execution of each loop included in the object program 3 when the object program 3 has been executed (step 23).

The branch history information code generating means 6 next generates a code for obtaining the number of repetitions of the instruction stream in each loop included in the object program 3 when the object program 3 has been executed (step 24).

The branch history information code generating means 6 finally generates a code for obtaining information when the object program 3 has been executed, the information indicative of whether or not branch conditions of the conditional branch instructions in each loop included in the object program 3 were satisfied (step 25).

After the branch history information code generating means 6 is activated, the compile device 2 generates the object program 3 which allocates the code generated at step 22 to the head of the program, the code generated at step 23 immediately before the first instruction of the instruction stream in each loop, the code generated at step 24 immediately after the first instruction of the instruction stream in each loop and the code generated at step 25 immediately after instructions at a destination branched by the conditional branch instructions in each loop (step 26).

When the object program 3 is executed, the information, indicative of how many times each loop has been executed within the object program 3, how many times the instruction stream has been repeated in each loop and whether or not branch conditions of the conditional branch instructions included in the instruction stream were satisfied, is recorded in the branch history information file 4.

The branch pattern analyzing means 7 analyzes the information recorded in the branch history information file 4 when the compile device 2 recompiles the same source program 1 to generate the object program 3.

Then the loop optimizing means 5 generates an optimum code for high-efficiency execution of the loops included in the object program 3 based on the analysis results by the branch pattern analyzing means 7.

Finally, the compile device 2 generates the object program 3 including the codes generated by the loop optimizing means 5.

Referring next to the accompanying drawings, a preferred embodiment of the present invention will be described.

In the embodiment, the present invention is applied to a vector computer having a vector length of 256.

A source program 1 shown in FIG. 3 is repeated until a variable I is changed from 1 to N (processing between "DO 10 I=1,N" and "10 CONTINUE"), and only when an array A having N elements in number is smaller than X (IF (A(I). LT. X) THEN), the sum of array elements B(I) and C(I) is substituted for A(I) (A(I)=B(I)+C(I)).

In FIG. 3, the source program 1 is taken instead of the object program 3 by way of example to clearly show the arrangement of the codes generated by the branch history information code generating means 6 and included in the object program 3.

Figure 4:
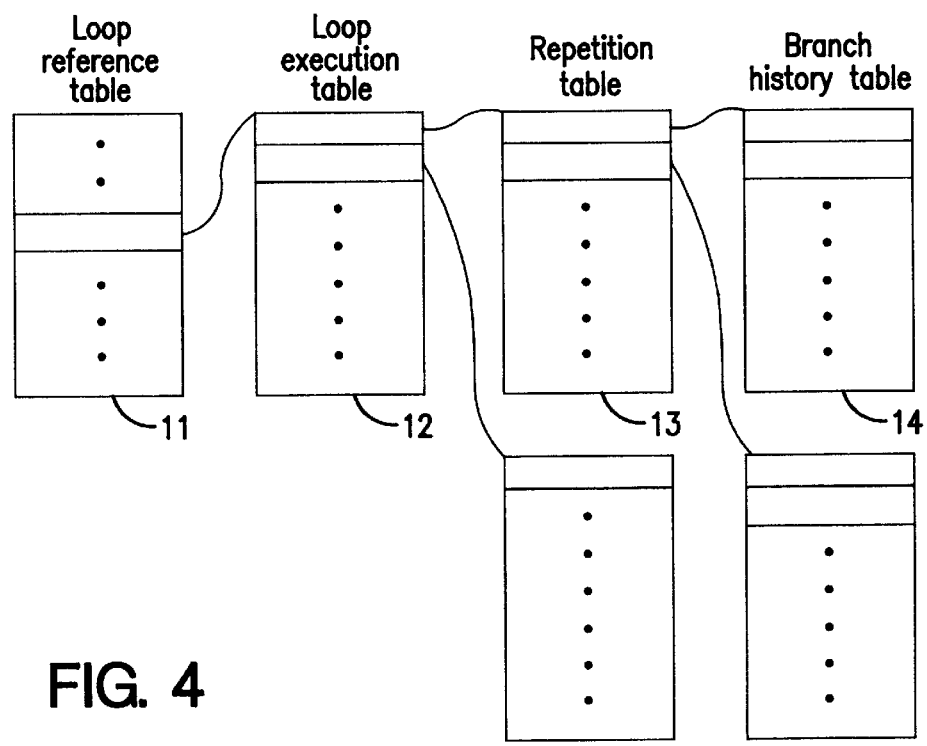
FIG. 4 is a diagram showing a storage form of information stored in a branch history information file 4 in the embodiment of the present invention.

When the object program 3 is executed, the information, indicative of the number of repetitions at each execution of each loop obtained and a branch history of conditional branch instructions in the loop, is recorded in the branch history information file 4 in the form of a table group such as one shown in FIG. 4.

In FIG. 4, a loop reference table 11 is for identifying which loop in the object program 3 the information is directed to, a loop execution table 12 is for identifying the number of times of the execution of the loop in the current execution cycle of the object program 3, a repetition table 13 is for identifying the number of repetitions of the instruction stream in the loop, and a branch history table 14 is for recording whether or not the branch conditions were satisfied during one repetition cycle.

The object program 3 padded with the codes for obtaining such information as the number of repetitions at each execution of each loop and the branch history of the conditional branch instructions in the loop creates the loop reference table 11 for each loop at the time of starting the execution of the object program 3. Then, the object program 3 adds a new entry into the loop execution table 12 derived from the entry in the loop reference table 11 at each loop execution, adds a new entry into the loop repetition table 13 derived from the entry in the loop execution table 12, and creates the branch history table 14 so as to record whether each of the branch conditions of the conditional branch instructions in the loop was "true" or "false".

Thus such information as to indicate which loop in the source program 1 was executed, how many times the loop has been executed, how many times the instruction stream has been repeated in the loop and which of the branch conditions in the loop was true or false is recorded in the branch history information file 4.

When the same source program 1 is recompiled, the branch analyzing means 7 analyzes a branch pattern of the conditional branch instructions in each loop stored in the branch history information file 4, and the loop optimizing means 5 generates codes for high-efficiency execution of the loop based on the analysis results. Then the compile device 2 generates the object program 3 including the codes generated by the loop optimizing means 5.

In the processing by the branch pattern analyzing means 7 and the loop optimizing means 5, various cases can be assumed depending on the variety of branch patterns of the conditional branch instructions in each loop stored in the branch history information file 4. The following is two exemplary cases.

In the first case, it is assumed that the loop in the source program 1 of FIG. 3 is executed once during execution of the program, the variable N is 1024, and the branch condition of the loop (A(I). LT. X, where A(I) is smaller than X) becomes "false" when the variable I ranges from 1 to 256 and "true" when the variable I is larger than 256 (ranging from 257 to 1024).

In this case, since the loop is executed once during execution of the program, there is one entry for the loop in the loop reference table 11 stored in the branch history information file 4, and also one entry in the loop execution table derived from the entry in the loop reference table 11. On the other hand, there are 1024 entries in the repetition table 13 derived from the entry in the loop execution table 12 since the instruction stream is repeated in the loop 1024 times. Thus the branch history table 14 stores therein the results of branch conditions for each repetition, where the branch history table 14 is derived from each entry in the repetition table 13.

In the branch history table 14, entries derived from the first to 256th entries in the repetition table 13 are all stored as "false" and the other entries following the 256th entry are all stored as "true".

If such branch pattern information is analyzed by the branch pattern analyzing means 7, the loop optimizing means 5 will determine that the program can execute given mask operation for improving its performance, and generates a code for mask operation.

When the mask operation is executed with a vector length of 256, the loop optimizing means 5 determines that the first 256 elements may not be processed. Consequently, the loop optimizing means 5 checks the mask used for the mask operation before the mask operation is executed, and generates an optional code for avoiding execution of the mask operation instruction when the check result shows that all the elements are not processed.

In other case, it is assumed that the loop in the source program 1 of FIG. 3 is executed 1024 times during execution of the program, the variable N is 1 at execution of all the loops, and the branch conditions become "true" in all the loops.

When the conventional technique is applied in this case, the true rate shows nothing but "1". It is therefore necessary either to generate a vector instruction based on the determination that vectorization can speed up the execution of the loops in the program, or to generate such a code as to influence the execution performance of the object program, i.e., a code for determining, depending on the number of repetitions of each loop during execution of the object program, which types of operations, vector type or scalar type, is used.

In contrast, the loop optimizing means 5 of the present invention determines that vectorization of each should not be performed because the number of repetitions of all the loops is "1" and too small for vectorization, from such information as the number of repetitions at each execution of each loop that is given by the branch pattern analyzing means 7, and generates a code for scalar operation. According to the present invention, such a code in the conventional as to influence the execution performance of the object program is never generated, so that the object program can be executed efficiently.

Thus, the operation of the first embodiment is completed.

Referring next to the accompanying drawings, a second embodiment of the present invention will be described in detail.

As shown in FIG. 1, the second embodiment is provided with a recording medium 8 such as a magnetic disk or semiconductor memory for storing a program to make the compile device 2 execute the processing according to the first embodiment.

The program stored in the recording medium 8 is read into the compile device 2 and used to control the operation of the compile device 2. In other words, the program enables the compile device 2 to execute the same processing as the loop optimizing means 5, branch history information code generating means 6 and the branch pattern analyzing means 7 in the first embodiment execute.

Thus, the processing of the second embodiment is completed.

As described above, the present invention, when an object program including loops with conditional branch instructions is generated, enables the compile device or the compiler to obtain information necessary for generation of an object program including an optimum code for high-efficiency execution of the loops.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A first compile device comprising:

branch history information code generating means which generates a first instruction for obtaining the number of loops, at least one loop, being included in an object program and each repeating a predetermined instruction stream plural times, a second instruction for obtaining the number of times of the execution of each loop at execution of the loop, a third instruction for obtaining the number of repetitions of the instruction stream in each loop at execution of the loop and a fourth instruction for obtaining information indicative of whether or not branch conditions of conditional branch instructions included in each loop were satisfied at execution of the loop; and compile means which enters a source program, activates said branch history information code generating means and generates an object program including the instruction group generated by said branch history information code generating means, wherein said compile means generates an object program which allocates the first instruction to the head of the program, the second instruction immediately before the first instruction of the instruction stream in each loop, the third instruction immediately after the first instruction of the instruction stream in each loop and the fourth instruction immediately after an instruction stream at a destination branched by the conditional branch instructions in each loop.

2. A compile method comprising:

a step of branch history information code generation, the step including generation of a first instruction for obtaining the number of loops, at least one loop, being included in an object program and each repeating a predetermined instruction stream plural times, a second instruction for obtaining the number of times of the execution of each loop at execution of the loop, a third instruction for obtaining the number of repetitions of the instruction stream in each loop at execution of the loop and a fourth instruction for obtaining information indicative of whether or not branch conditions of conditional branch instructions included in each loop were satisfied at execution of the loop; and a compile step at which a source program is entered, said branch history information code generating step is executed and an object program including the instruction group generated at said branch history information code generating step is generated, wherein at said compile step the object program is so generated that the first instruction is allocated to the head of the program, the second instruction immediately before the first instruction of the instruction stream in each loop, the third instruction immediately after the first instruction of the instruction stream in each loop and the fourth instruction immediately after an instruction stream at a destination branched by the conditional branch instructions in each loop.

3. A recording medium which records thereon a program to make a computer execute its program processing, the program comprising:

branch history information code generation processing which generates a first instruction for obtaining the number of loops, at least one loop, being included in an object program and each repeating a predetermined instruction stream plural times, a second instruction for obtaining the number of times of the execution of each loop at execution of the loop, a third instruction for obtaining the number of repetitions of the instruction stream in each loop at execution of the loop and a fourth instruction for obtaining information indicative of whether or not branch conditions of conditional branch instructions included in each loop were satisfied at execution of the loop; and compile processing which enters a source program, executes said branch history information code generation processing and generates an object program including the instruction group generated in said branch history information code generation processing, wherein in said compile processing the object program is so generated that the first instruction is allocated to the head of the program, the second instruction immediately before the first instruction of the instruction stream in each loop, the third instruction immediately after the first instruction of the instruction stream in each loop and the fourth instruction immediately after an instruction stream at a destination branched by the conditional branch instructions in each loop.

* * * * *